US012635011B2

(12) United States Patent
Tang et al.

(10) Patent No.: US 12,635,011 B2
(45) Date of Patent: May 19, 2026

(54) METHOD OF QUICK PAIRING BETWEEN SECURITY CAMERA AND SECURITY PANEL

(71) Applicant: Syber Sense IP Holdings, LLC, Millcreek, UT (US)

(72) Inventors: Lap Tak Tang, Hong Kong (CN); Barrett Morgan, Millcreek, UT (US)

(73) Assignee: SYBER SENSE IP HOLDINGS, LLC, Millcreek, UT (US)

( * ) Notice: Subject to any disclaimer, the term of this patent is extended or adjusted under 35 U.S.C. 154(b) by 344 days.

(21) Appl. No.: 18/447,984

(22) Filed: Aug. 10, 2023

(65) Prior Publication Data

US 2024/0057181 A1     Feb. 15, 2024

Related U.S. Application Data

(60) Provisional application No. 63/397,108, filed on Aug. 11, 2022.

(51) Int. Cl.
*H04W 76/11* (2018.01)
*H04W 88/08* (2009.01)

(52) U.S. Cl.
CPC ........... *H04W 76/11* (2018.02); *H04W 88/08* (2013.01)

(58) Field of Classification Search
CPC ..... H04W 4/38; H04W 12/03; H04W 12/068; H04W 48/08; H04W 60/00; H04W 76/10; H04W 76/11; H04W 84/12
USPC ......................................... 370/254, 328, 401
See application file for complete search history.

(56) References Cited

U.S. PATENT DOCUMENTS

| | | | | |
|---|---|---|---|---|
| 2021/0204128 A1* | 7/2021 | Nallaperumal | ....... | H04W 60/00 |
| 2022/0028249 A1* | 1/2022 | Saldin | ..................... | H04W 4/38 |
| 2022/0159559 A1* | 5/2022 | Luo | ........................ | H04W 76/10 |
| 2025/0227207 A1* | 7/2025 | Laurans | ................ | H04W 76/10 |

* cited by examiner

*Primary Examiner* — Harun Chowdhury
(74) *Attorney, Agent, or Firm* — Kilpatrick Townsend & Stockton LLP

(57) ABSTRACT

Techniques for quick pairing between detection devices and security panels are described herein. For example, a hub can receive an input that directs the hub to enter a pairing mode. In response, the hub can enter into the pairing mode by detecting that a first detection device has entered an access point mode for extending a range of a wireless network for the first detection device. The hub can receive an identification for the wireless network for the first detection device from the first detection device. The hub can be connected to the wireless network for the first detection device using the identification. The first detection device can be paired to a wireless router.

20 Claims, 8 Drawing Sheets

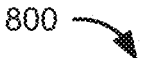

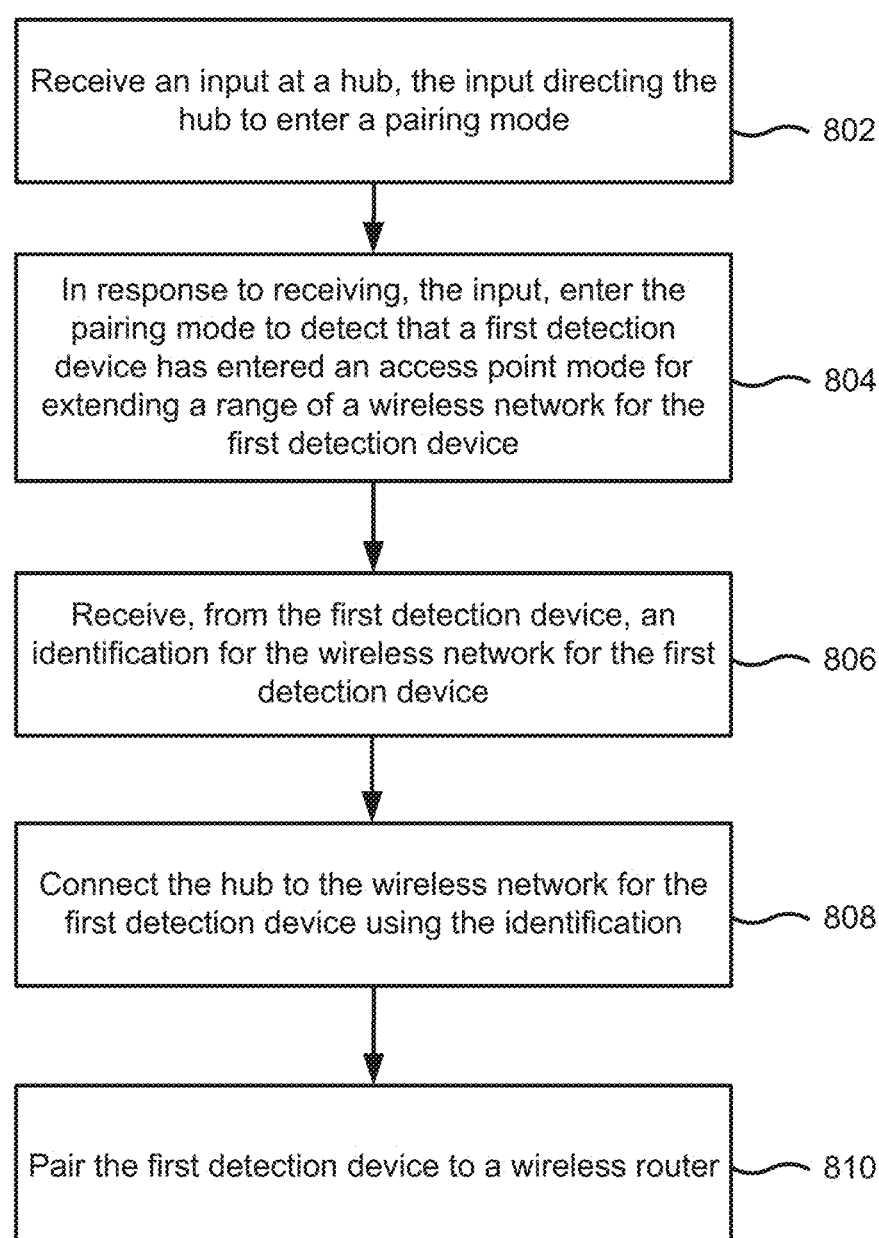

800

Receive an input at a hub, the input directing the hub to enter a pairing mode — 802

In response to receiving, the input, enter the pairing mode to detect that a first detection device has entered an access point mode for extending a range of a wireless network for the first detection device — 804

Receive, from the first detection device, an identification for the wireless network for the first detection device — 806

Connect the hub to the wireless network for the first detection device using the identification — 808

Pair the first detection device to a wireless router — 810

FIG. 8

METHOD OF QUICK PAIRING BETWEEN SECURITY CAMERA AND SECURITY PANEL

CROSS-REFERENCES TO RELATED APPLICATIONS

This claims the benefit of priority of U.S. Provisional Patent Application No. 63/397,108, titled "A METHOD OF QUICK PAIRING BETWEEN SECURITY CAMERA AND SECURITY PANEL" and filed Aug. 11, 2022, the entirety of which is incorporated herein by reference.

BACKGROUND

Home security systems can include various devices for detecting objects and/or people. For example, home security systems can include various detection devices, for example, cameras, motion sensors, and heat sensors. The detection devices can connect with wireless internet (WiFi). However, the detection devices may use different procedures to pair with the WiFi or the pairing methods may require many different steps. Additionally, if the detection devices or the WiFi lose power or the connection between the detection devices and the WiFi is broken, the pairing procedures may have to be redone.

BRIEF DESCRIPTION OF THE DRAWINGS

Various embodiments in accordance with the present disclosure will be described with reference to the drawings, in which:

FIG. 8 is another example process of a one-button pairing method for a home security system.

DETAILED DESCRIPTION

Figure 1:
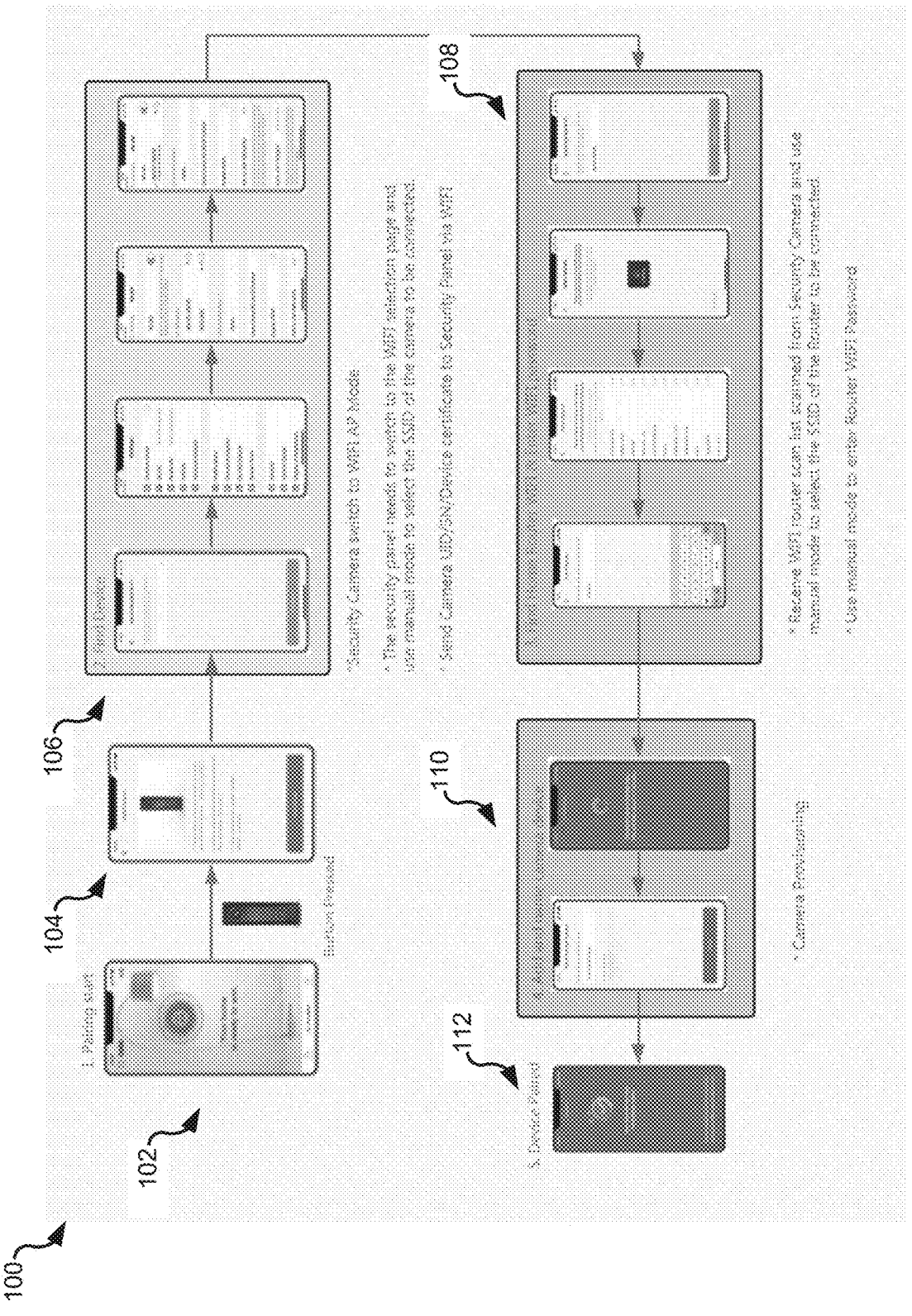
FIG. 1 is an example process of a conventional pairing method for a home security system that includes a manual operation.

Home security systems can detect various events (e.g., motion events) that may occur in the building and/or a dwelling of a user. The events can be detected by one or more detection devices positioned around the building and/or the dwelling of the user. These detection devices may have to connect with wireless internet (e.g., WiFi). However, the pairing process can be different for different detection device types and the process can include many complicated steps. For example, the process can include pressing a pairing mode, choosing a device SSIS, scanning for WiFi, choosing the correct WiFi, typing in the password for the WiFi, and finally connecting. Additionally, if the WiFi or detection device lose power or the connection between the hub and the detection devices is disrupted, the detection devices may have to be paired with the hub again.

This application relates to a home security system that includes various detection devices. The home security system can include a hub (e.g., a security gateway) that communicates with various detection devices (e.g., cameras, motions sensors, intercoms, door sensors, window sensors, smoke sensors, heat sensors, $CO_2$ and/or doorbells). The detection devices can be paired with the hub using a simplified process. For example, a user can tell the hub to pair with the detection devices and the hub can automatically proceed through the steps of pairing with the hub.

An example home security system can include detection devices and a central hub. The detection devices can be paired with the central hub for communication with the central hub. The process of pairing the detection devices with the hub can be a simplified process, as compared to conventional approaches. For example, the process can include putting the hub and/or the detection devices in a pairing mode. In the pairing mode the hub can automatically find the detection device, configure the WiFi, and add and name the detection device. For example, the detection device may transmit sub-GHz radio frequency signals to the hub in response to a user pressing a button on the detection device. The hub may detect and communicate with the detection device via the sub-GHz radio frequency signals to automatically add the detection device to the home security system. With the simplified process, a user can pair many detection devices with the central hub in a short period of time and/or with minimal interactions. Additionally, if the detection devices or the hub lose power or the connection is lost, the hub can reestablish the connection between the hub and the detection devices automatically. For example, the hub can reconnect the detection device with the WiFi without intervention from the user.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Turning now to the figures, FIG. 1 is an example process 100 of a conventional pairing method for a home security system that includes a manual operation. The home security system may include a central hub connected to a wireless router. As depicted in FIG. 1, a user may interact with the hub via an application on a user device. In other examples, a user may interact with the hub via a security panel or a security gateway. At step 102, the process 100 can involve receiving an input from a user directing the hub to initiate a pairing process with a camera. In other examples, the hub may pair with any type of detection device, such as a motion sensor or a doorbell. An example of the input can include a user pressing a button on the application for the hub to start the pairing process. Alternatively, the input can include a user pressing a button on the camera to start the pairing process. At step 104, the process 100 can involve receiving, by the camera, an input from a user directing the detection device to enter an access point (AP) mode. For example, the input may include the user pressing a button on the camera to enter the AP mode. Entering the AP mode may extend a range of a wireless local area network (WLAN) for the camera.

At step 106, the process 100 can involve detecting and connecting the hub to the camera. After the detection device has entered the AP mode, the user may open the network settings in the application for the hub to detect the WLAN for the camera. The user may then manually wirelessly connect the hub to the WLAN for the camera by inputting the service set identifier (SSID) for the camera into the application for the hub. At step 108, the process 100 can involve pairing the camera to a wireless router. The camera can transmit a list of one or more wireless routers detected by the camera to the hub via the wireless connection. In some examples, the camera may receive an input from the user directing the camera to transmit the list of one or more wireless routers. The user may view the list of the one or more wireless routers received by the application for the hub and may manually select one of the one or more wireless routers to be wirelessly connected to the camera. The user may then input a password for the wireless router into the camera to connect the camera to a network for the wireless router. If the wireless connection is weak, the user may restart the wireless connection between the camera and the wireless router by inputting the password again.

At step 110, the process 100 can involve adding a name for the camera to the application for the hub. For example, after the camera connects to the wireless router, the user can select the camera in the application for the hub and can input a name for the camera. At step 112, the camera is paired to the wireless router and the hub, and the process 100 ends. In some examples, the process 100 can require multiple manual inputs for multiple devices, such as the application for the hub and the camera. As some steps may involve waiting for various devices to complete operations, the process 100 may be lengthy. For example, the process 100 may take five minutes or longer to pair a single detection device.

Figure 2:
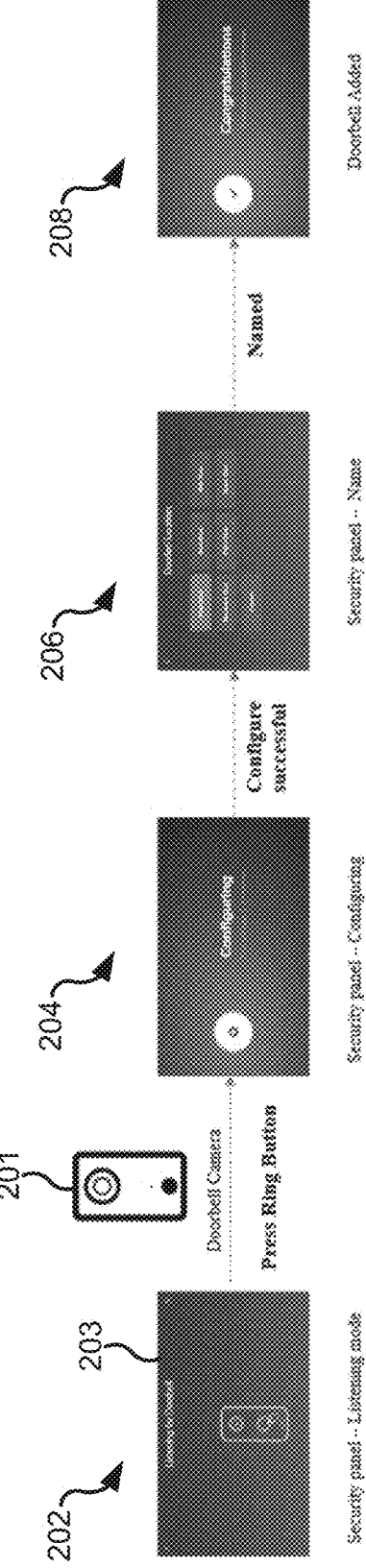
FIG. 2 is an example process of a one-button pairing method for a home security system.

Turning to FIG. 2, an example process 200 of a one-button pairing method for a home security system is shown. The home security system can include a hub, such as a security panel 203, connected to a wireless router (not shown). At step 202, the security panel 203 can transmit a command to a doorbell camera 201 to enter an AP mode. For example, a user may enter an adding page on the security panel 203 and may select a doorbell camera button to direct the security panel 203 to enter a pairing mode for the doorbell camera 201 to transmit the command. In some examples, the command transmitted to the doorbell camera 201 can be a sub-GHz radio frequency (RF) signal, such as a 433 MHz signal.

At step 204, the security panel 203 can automatically add the doorbell camera 201 to the home security system. For example, in response to receiving the sub-GHz RF signal, the doorbell camera 201 may enter the AP mode and may extend a range of a wireless network for the doorbell camera 201 to allow the security panel 203 to connect with the wireless network. After the security panel 203 wirelessly connects to the wireless network for the doorbell camera 201, the security panel 203 can cause the doorbell camera 201 to wirelessly connect to the wireless router. For example, the security panel 203 can transmit an SSID and a password for the wireless router to the doorbell camera 201. The security panel 203 can direct the doorbell camera 201 to connect to the wireless router using the SSID and the password.

At step 206, the security panel 203 can automatically name the doorbell camera 201 within the home security system. For example, the security panel 203 may detect that the detection device is a doorbell camera and may name it "Doorbell." The security panel 203 may detect other characteristics of the doorbell camera 201 to determine the name. For example, if the doorbell camera 201 is a first doorbell camera added to the home security system, the security panel 203 may name the doorbell camera 201 "First Doorbell Camera." In another example, the security panel 203 may detect that the doorbell camera 201 is positioned at a front door. The security panel 203 may then name the doorbell camera 201 "Front Doorbell Camera." At step 208, the doorbell camera 201 is added to the home security system and the process 200 is complete. The process 200 may be a quick process compared to the process 100. For example, the process 200 may be completed in 20 seconds or less. In some examples, additional detection devices can be added to the home security system using the same process 200.

Figure 3:
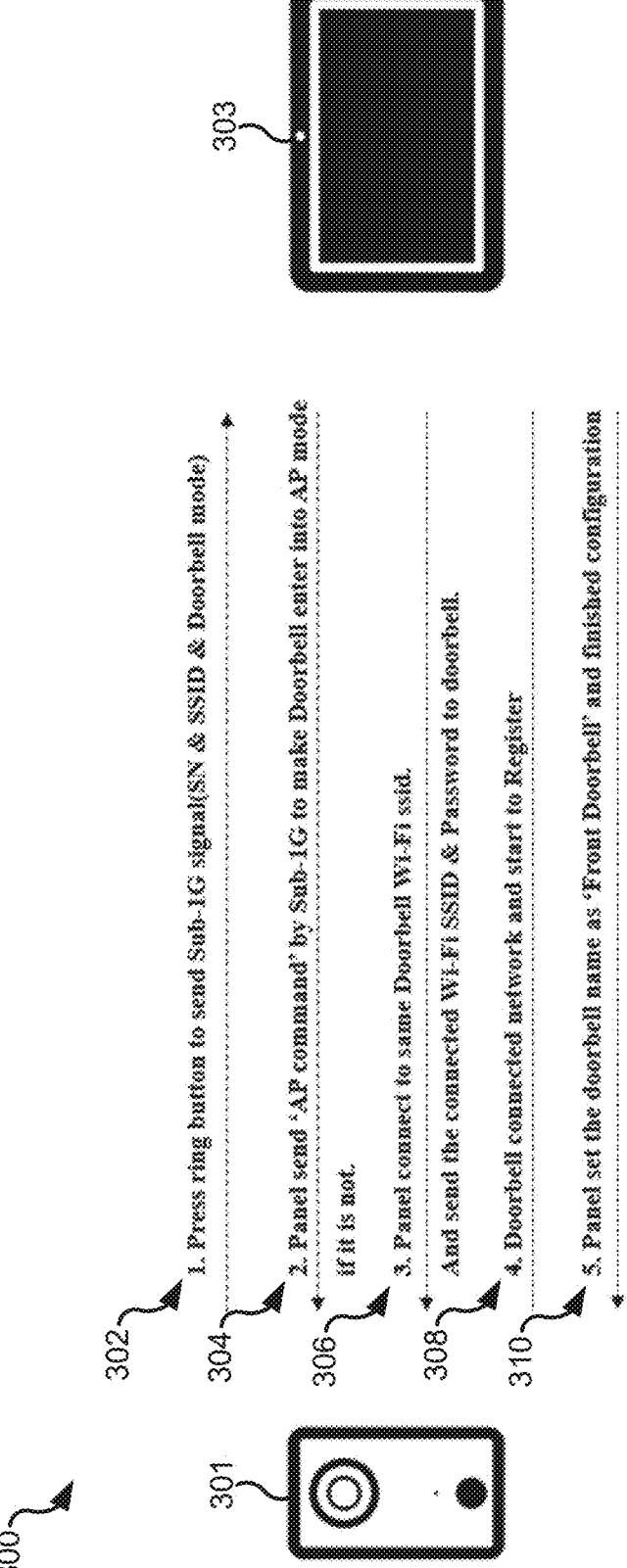
FIG. 3 is another example process of a one-button pairing method for a home security system.

Turning to FIG. 3, another example process of a one-button pairing method for a home security system is shown. The home security system can include a hub, such as security panel 303 connected to a wireless router (not shown). At step 302, the process 300 can involve a user pressing a ring button on a doorbell camera 301 to direct the doorbell camera 301 to transmit a sub-GHz RF signal to the security panel 303. The sub-GHz RF signal can include a serial number for the doorbell camera 301, an SSID for WiFi for the doorbell camera 301, and a current mode of the WiFi for the doorbell camera 301. For example, the doorbell camera 301 may be in an AP mode to extend the range of the WiFi to connect with other wireless devices. In other examples, the doorbell camera 301 may be in other modes, such as router mode. At step 304, the process 300 can involve the security panel 303 receiving the sub-GHz RF signal. The security panel 303 may determine if the doorbell camera 301 is in AP mode. If the doorbell camera 301 is not in AP mode, the security panel 303 can transmit a command using the sub-GHz RF signal directing the doorbell camera 301 to enter the AP mode.

At step 306, the process 300 can involve the security panel 303 connecting to the WiFi for the doorbell camera 301 using the SSID transmitted by the doorbell camera 301. Using the WiFi for the doorbell camera 301, the security panel 303 can transmit an SSID and a password for WiFi from a wireless router to the doorbell camera 301. At step 308, the doorbell camera 301 can receive the SSID and the password for the WiFi from the wireless router and can use the SSID and the password to connect to the WiFi from the wireless router. At step 310, the security panel 303 can determine that the doorbell camera 301 is paired to the wireless router and can name the doorbell camera 301 within the home security system. For example, the security panel 303 may name the doorbell camera 301 "Front Doorbell" and may finish configuring the doorbell camera 301. The process 300 may be a quick process compared to the process 100. For example, the process 300 may be completed in 20 seconds or less. In some examples, additional detection devices can be added to the home security system using the same process 300.

Figure 4:
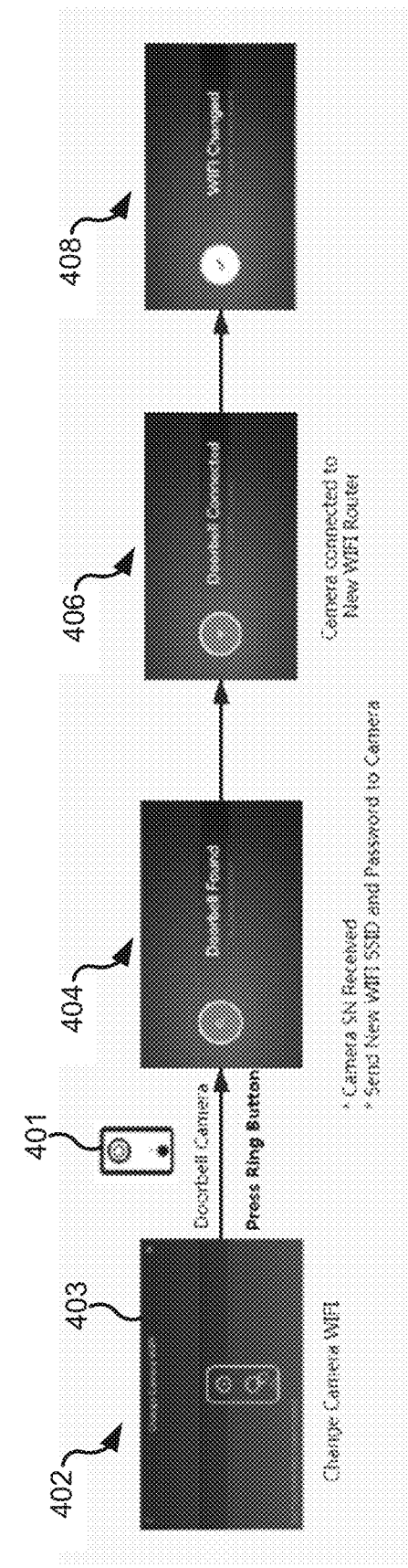
FIG. 4 is an example process of a one-button method for pairing a detection device with a new wireless router.

Turning to FIG. 4, an example process of a one-button method for pairing a detection device with a new wireless router is shown. The home security system can include a hub, such as security panel 403, a detection device, such as doorbell camera 401, and a wireless router (not shown). The doorbell camera 401 may be connected to the wireless router. At step 402, the process 400 can involve the security panel 403 receiving an input directing the security panel 403 to pair the doorbell camera 401 with a new wireless router (not shown). For example, the input may be received in response to a user pressing a camera button on the security panel 403. The security panel 403 may already be wirelessly connected to the new wireless router. In response to receiving the input, the security panel 403 can transmit a command via a sub-GHz RF signal to the doorbell camera 401. The command can include the SSID and password for the new wireless router.

At step 404, the process 400 can involve the security panel 403 determining that the doorbell camera 401 is paired to the new wireless router. For example, the security panel 403 may detect that the doorbell camera 401 is connected to the WiFi from the new wireless router. The doorbell camera 401 may pair to the new wireless router using the SSID and password received from the security panel 403. At step 408, the doorbell camera 401 is added to the home security system and the process 400 is complete. In some examples where the security panel 403 is switched to a new user account, the doorbell camera 401 may need to re-transmit the serial number for the doorbell camera 401 for security reasons. In such examples, the security panel 403 may transmit a sub-GHz RF signal to the doorbell camera 401 to request that the doorbell camera 401 enter an AP mode before sending the SSID and password for the new wireless router to the doorbell camera 401. The doorbell camera 401 may then enter the AP mode to transmit the serial number for the doorbell camera 401 to the security panel 403.

Figure 5:
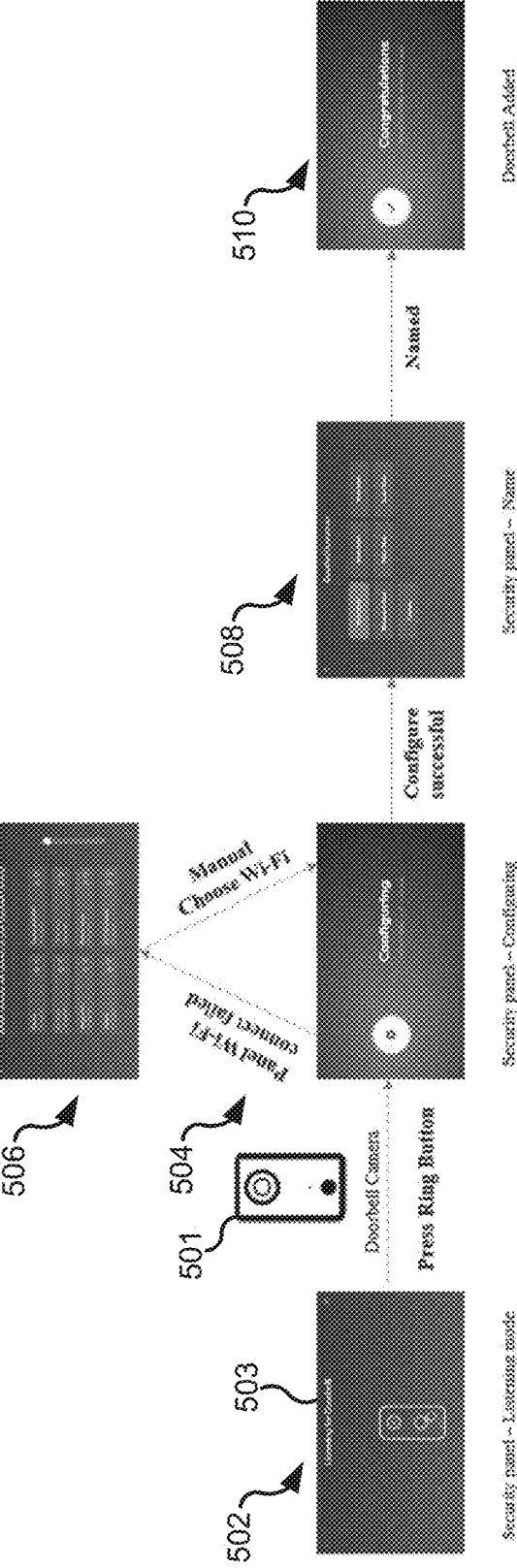
FIG. 5 is an example process of pairing a detection device after a failed pairing for a home security system.

Turning to FIG. 5, an example process of pairing a detection device after a failed pairing for a home security system is shown. The home security system can include a hub, such as security panel 503, and a detection device, such as doorbell camera 501. At step 502, the process 500 can involve the security panel 503 transmitting a command to the doorbell camera 501 to enter an AP mode. As part of a pairing mode, the security panel 503 can be in a listening mode to detect detection devices before sending the command to the doorbell camera 501. For example, a user may enter an adding page on the security panel 503 and may select a doorbell camera button to direct the security panel 503 to enter the listening mode for the doorbell camera 501. In some examples, the command transmitted to the doorbell camera 501 can be a sub-GHz radio frequency (RF) signal.

At step 504, the process 500 can involve the security panel 203 attempting to automatically add the doorbell camera 501 to the home security system. For example, in response to receiving the sub-GHz RF signal, the doorbell camera 501 may enter the AP mode and may extend a range of a wireless network for the doorbell camera 501 to allow the security panel 503 to connect with the wireless network. After the security panel 503 wirelessly connects to the wireless network for the doorbell camera 501, the security panel 503 can cause the doorbell camera 501 to wirelessly connect to the wireless router. For example, the security panel 503 can transmit an SSID for the wireless router and a password for the wireless router to the doorbell camera 501. The security panel 503 can direct the doorbell camera 501 to wirelessly connect to the wireless router using the SSID and the password. If the doorbell camera 501 successfully wirelessly connects to the wireless router, the process 500 continues to step 508.

In some examples, the doorbell camera 501 may not automatically wirelessly connect to the wireless router. For example, the doorbell camera 501 may be positioned too far from the wireless router to have a strong connection. If the doorbell camera 501 does not successfully wirelessly connect to the wireless router, the process 500 continues to step 506. At step 506, the process 500 can involve the security panel 503 detecting that the doorbell camera 501 has not connected to the wireless router and prompting the user to manually connect the doorbell camera 501 to the wireless router. For example, the security panel 503 may display a list of available wireless routers scanned by the doorbell camera

501. The user may select a particular wireless router from the list of available wireless routers to connect with the doorbell camera 501, such as a closer or stronger wireless router. The security panel 503 can transmit an SSID and password for the particular wireless router to the doorbell camera 501. In some examples, the security panel 503 can transmit the SSID and password via a sub-GHz RF signal, or through the wireless network for the doorbell camera 501. The doorbell camera 501 can automatically connect to the particular wireless router using the SSID and password.

At step 508, the process 500 can involve the security panel 503 detecting that the doorbell camera 501 has successfully connected to the wireless router and naming the doorbell camera 501. For example, the security panel 503 may automatically name the doorbell camera 501 based on detected characteristics of the doorbell camera 501. At step 510, the doorbell camera 501 can be added to the home security system and the process 500 is complete.

Figure 6:
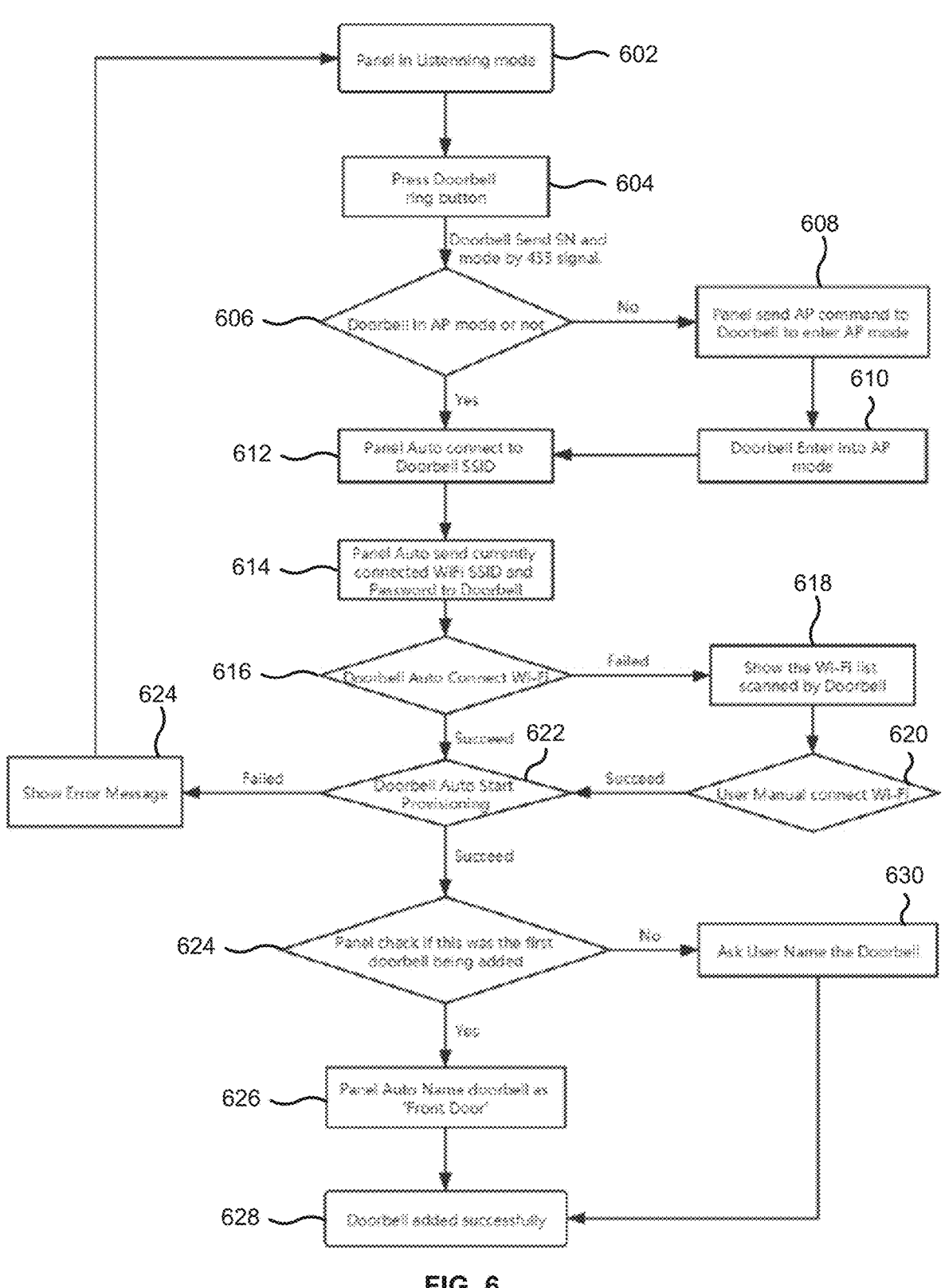
FIG. 6 is another example process of a one-button pairing method for a home security system.

Turning to FIG. 6, another example process of a one-button pairing method for a home security system is shown. The home security system can include a hub, such as a security panel. At step 602, the process 600 can involve the security panel acting in a listening mode. In the listening mode, the security panel can be listening for 433 MHz signals sent from detection devices. Additionally or alternatively, the security panel may be listening for sub-GHz RF signals sent from detection devices. At step 604, the process 600 can involve a user pressing a button on a detection device, such as a doorbell camera, to begin the pairing method. Pressing the button can prompt the doorbell camera to send a serial number for the doorbell camera and a current mode for the doorbell camera to the security panel as a 433 MHz signal or sub-GHz RF signal. For example, the current mode may be a router mode, in which the doorbell camera can connect to a wireless router, or an AP mode, in which the doorbell camera can extend a range of its WiFi to allow the doorbell camera to connect to other devices.

At step 606, the process 600 can involve the security panel receiving the 433 MHz signal and determining if the doorbell camera is in an AP mode. If the doorbell camera is in an AP mode, the process 600 can continue to step 612. If the doorbell camera is not in an AP mode, the process 600 can continue to step 608. At step 608, the process 600 can involve the security panel sending an AP command to the doorbell camera directing the doorbell camera to enter the AP mode. For example, the security panel may transmit the AP command as a 433 MHz signal or a sub-GHz RF signal. At step 610, the process 600 can involve the doorbell camera entering into the AP mode in response to receiving the AP command from the security panel.

At step 612, the process 600 can involve the security panel automatically connecting to the WiFi for the doorbell camera. In some examples, because the range of the WiFi for the doorbell camera was extended in AP mode, the security panel can detect or receive the SSID for the WiFi for the doorbell camera. The security panel can use the SSID to connect to the WiFi for the doorbell camera. The security panel may have previously been connected to WiFi from a wireless router. At step 614, the process 600 can involve the security panel automatically transmitting the SSID and password for the wireless router to which the security panel was previously connected to the doorbell camera. The security panel can transmit the SSID and password to the doorbell camera via the WiFi for the doorbell camera. At step 616, the process 600 can involve the doorbell camera automatically connecting to the wireless router. The doorbell panel can switch from the AP mode to the router mode in order to connect to the wireless router. The doorbell camera may connect to the wireless router using the SSID and password received from the security panel. If the doorbell camera successfully automatically connects to the wireless router, the process 600 can continue to step 622. If the doorbell camera does not successfully automatically connect to the wireless router, the process 600 can continue to step 618.

At step 618, the process 600 can involve receiving, by the security panel, a list of available wireless routers scanned by the doorbell camera. The doorbell camera may transmit the list to the security panel via the WiFi for the doorbell camera, the sub-GHz RF signal, or the 433 MHz signal. The security panel may display the list of available wireless routers to the user. At step 620, the process 600 can involve the security panel receiving an input from the user indicating a wireless router to which the doorbell camera should connect. The security panel may automatically transmit the SSID and password for the wireless router to the doorbell camera. The doorbell camera may use the SSID and password to automatically connect to the wireless router.

At step 622, the process 600 can involve the security panel automatically configuring the doorbell camera to be part of the home security system. For example, the security panel can determine if the wireless connection between the doorbell camera and the wireless router is strong enough to be part of the home security system. If the connection is strong enough, the process 600 can continue to step 624. If the connection is not strong enough, the process 600 can continue to step 602 and the process 600 can begin again.

At step 624, the process 600 can involve the security panel determining if the doorbell camera was the first detection device added to the home security system. If the doorbell camera is the first detection device added to the home security system, the process 600 can continue to step 626. If the doorbell camera is not the first detection device added to the home security system, the process 600 can continue to step 630. At step 630, the process 600 can involve the security panel prompting the user to input a name for the doorbell camera. The security panel can receive the name from the user and can assign the name to the doorbell camera.

At step 626, the process 600 can involve the security panel automatically naming the doorbell camera. The security panel can automatically name the doorbell camera based on the doorbell camera being the first detection device added to the home security system. For example, the security panel may name the doorbell panel "Front Door," as the front door may be a likely location for a first doorbell camera. At step 628, the doorbell camera can be successfully added to the home security system and the process 600 can be complete.

Figure 7:
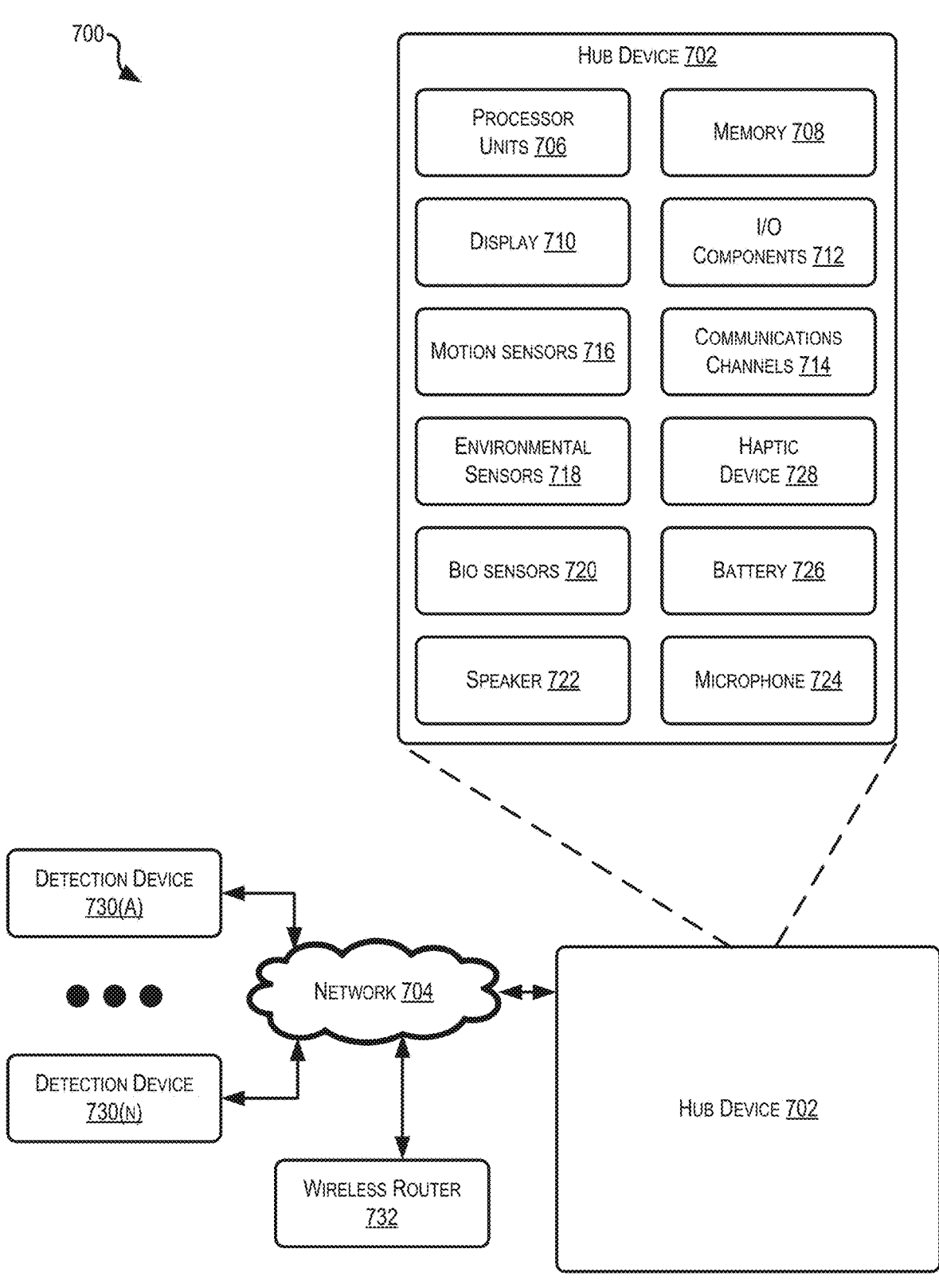
FIG. 7 is a block diagram of a home security system.

Turning to FIG. 7, a block diagram of a home security system 700 in accordance with an embodiment is shown. The home security system 700 can include a hub device 702, which can be or include a security panel 303 and/or a detection device that may communicate with various other devices and systems via one or more networks 704. At least one of the one or more networks 704 can be generated by a wireless router 732.

As shown in FIG. 7, the hub device 702 (e.g., the security panel 203 and/or the detection device) includes one or more processor units 706 that are configured to access a memory 708 having instructions stored thereon. The processor units 705 of FIG. 7 may be implemented as any electronic device capable of processing, receiving, or transmitting data or instructions. For example, the processor units 706 may include one or more of a microprocessor, a central processing unit (CPU), an application-specific integrated circuit (ASIC), a digital signal processor (DSP), or combinations of such devices. As described therein, the term "processor" is meant to encompass a single processor or processing unit, multiple processors, multiple processing units, or other suitably configured computing element or elements.

The memory 708 may include removable and/or non-removable elements, both of which are examples of non-transitory computer-readable storage media. For example, non-transitory computer-readable storage media may include volatile or non-volatile, removable or non-removable media implemented in any method or technology for storage of information such as computer-readable instructions, data structures, program modules, or other data. The memory 708 is an example of non-transitory computer storage media. Additional types of computer storage media that may be present in the hub device 702 may include, but are not limited to, phase change RAM (PRAM), static random-access memory (SRAM), dynamic random-access memory (DRAM), random-access memory (RAM), read-only memory (ROM), electrically erasable programmable read-only memory (EEPROM), flash memory or other memory technology, compact disc read-only memory (CD-ROM), digital video disc (DVD) or other optical storage, magnetic cassettes, magnetic tape, magnetic disk storage or other magnetic storage devices, or any other medium that can be used to store the desired information and that can be accessed by the hub device 702. Combinations of any of the above should also be included within the scope of non-transitory computer-readable storage media. Alternatively, computer-readable communication media may include computer-readable instructions, program modules, or other data transmitted within a data signal, such as a carrier wave, or other transmission. However, as used herein, computer-readable storage media does not include computer-readable communication media.

In addition to storing computer-executable instructions, the memory 708 may be configured to store historical sensor profiles. A historical sensor data profile may identify, for a particular set of conditions, configuration settings for operating the sensors of the hub device 702 and/or detection device 730 (e.g., arm, away, home, etc.). The detection devices 730A-N can be or can include the doorbell camera 201, the doorbell camera 301, the doorbell camera 401, or the doorbell camera 501. For example, the detection devices 730A-N can be or include cameras, motion sensors, intercoms, security panels, a gas sensor, a heat sensor, a smoke sensor, and/or doorbells. In some examples, the historical sensor data profile may be generated using historical data collected from other users in a controlled or uncontrolled environment. Machine-learning techniques may be applied to the historical data to build the profiles. In some examples, the profiles may be user-defined.

The instructions or computer programs may be configured to perform one or more of the operations or functions described with respect to the hub device 702. For example, the instructions may be configured to control or coordinate the operation of the various components of the device. Such components include, but are not limited to, display 710, one or more input/output (I/O) components 712, one or more communications channels 714, one or more motion sensors 716, one or more environmental sensors 718, one or more bio sensors 720, a speaker 722, microphone 724, a battery 726, and/or one or more haptic feedback devices 728.

The display 710 may be configured to display information via one or more graphical user interfaces and may also function as an input component, e.g., as a touchscreen.

Messages relating to the execution of exams may be presented at the display 710 using the processor units 706.

The I/O components 712 may include a touchscreen display, as described, and may also include one or more physical buttons, knobs, and the like disposed at any suitable location with respect to a bezel of the hub device 702. In some examples, the I/O components 712 may be located on an edge of the hub device 702.

The communication channels 714 may include one or more antennas and/or one or more network radios to enable communication between the hub device 702 and other electronic devices such as one or more other detection devices 730, other electronic devices such as a smartphone or tablet, or other wearable electronic devices, external computing systems such as a desktop computer or network-connected server. In some examples, the communication channels 714 may enable the hub device 702 to pair with a primary device such as a smartphone. The pairing may be via Bluetooth or Bluetooth Low Energy (BLE), near-field communication (NFC), or other suitable network protocol, and may enable some persistent data sharing. For example, data from the hub device 702 may be streamed and/or shared periodically with the smartphone, and the smartphone may process the data and/or share with a server. In some examples, the hub device 702 may be configured to communicate directly with the server via any suitable network, e.g., the Internet, a cellular network, etc.

The sensors of the hub device 702 may be generally organized into three categories including motion sensors 716, environmental sensors 718, and bio sensors 720. As described herein, reference to "a sensor" or "sensors" may include one or more sensors from any one and/or more than one of the three categories of sensors. In some examples, the sensors may be implemented as hardware elements and/or in software.

Generally, the motion sensors 716 may be configured to measure acceleration forces and rotational forces along three axes. Examples of motion sensors include accelerometers, gravity sensors, gyroscopes, rotational vector sensors, significant motion sensors, step counter sensor, Global Positioning System (GPS) sensors, and/or any other suitable sensors. Motion sensors may be useful for monitoring device movement, such as tilt, shake, rotation, or swing. The movement may be a reflection of direct user input, but it can also be a reflection of the physical environment in which the device is sitting. The motion sensors may monitor motion relative to the device's frame of reference or your application's frame of reference. The motion sensors may monitor motion relative to the world's frame of reference. Motion sensors by themselves are not typically used to monitor device position, but they can be used with other sensors, such as the geomagnetic field sensor, to determine a device's position relative to the world's frame of reference. The motion sensors 716 may return multi-dimensional arrays of sensor values for each event when the sensor is active. For example, during a single sensor event the accelerometer may return acceleration force data for the three coordinate axes, and the gyroscope may return rate of rotation data for the three coordinate axes.

Generally, the environmental sensors 718 may be configured to measure environmental parameters such as temperature and pressure, illumination, and humidity. The environmental sensors 718 may also be configured to measure physical position of the device. Examples of environmental sensors 718 may include barometers, photometers, thermometers, orientation sensors, magnetometers, Global Positioning System (GPS) sensors, and any other suitable sensor.

The environmental sensors 718 may be used to monitor relative ambient humidity, illuminance, ambient pressure, and ambient temperature near the hub device 702. In some examples, the environmental sensors 718 may return a multi-dimensional array of sensor values for each sensor event or may return a single sensor value for each data event. For example, the temperature in ° C. or the pressure in hPa. Also, unlike motion sensors 716 and bio sensors 720, which may require high-pass or low-pass filtering, the environmental sensors 718 may not typically require any data filtering or data processing.

The environmental sensors 718 may also be useful for determining a device's physical position in the world's frame of reference. For example, a geomagnetic field sensor may be used in combination with an accelerometer to determine the user device's 702 position relative to the magnetic north pole. These sensors may also be used to determine the user device's 702 orientation in some of frame of reference (e.g., within a software application). The geomagnetic field sensor and accelerometer may return multi-dimensional arrays of sensor values for each sensor event. For example, the geomagnetic field sensor may provide geomagnetic field strength values for each of the three coordinate axes during a single sensor event. Likewise, the accelerometer sensor may measure the acceleration applied to the device 1102 during a sensor event. The proximity sensor may provide a single value for each sensor event.

Generally, the bio sensors 720 may be configured to measure biometric signals of a wearer of the hub device 702 such as, for example, heartrate, blood oxygen levels, perspiration, skin temperature, etc. Examples of bio sensors 720 may include a hear rate sensor (e.g., photoplethysmography (PPG) sensor, electrocardiogram (ECG) sensor, electroencephalography (EEG) sensor, etc.), pulse oximeter, moisture sensor, thermometer, and any other suitable sensor. The bio sensors 720 may return multi-dimensional arrays of sensor values and/or may return single values, depending on the sensor.

The acoustical elements, e.g., the speaker 722 and the microphone 724 may share a port in housing of the hub device 702 or may include dedicated ports. The speaker 722 may include drive electronics or circuitry and may be configured to produce an audible sound or acoustic signal in response to a command or input. Similarly, the microphone 724 may also include drive electronics or circuitry and is configured to receive an audible sound or acoustic signal in response to a command or input. The speaker 722 and the microphone 724 may be acoustically coupled to a port or opening in the case that allows acoustic energy to pass, but may prevent the ingress of liquid and other debris.

The battery 726 may include any suitable device to provide power to the hub device 702. In some examples, the battery 726 may be rechargeable or may be single use. In some examples, the battery 726 may be configured for contactless (e.g., over the air) charging or near-field charging.

The haptic feedback device 728 may be configured to provide haptic feedback to a user of the hub device 702. For example, alerts, instructions, and the like may be conveyed to the user using the speaker 722, the display 710, and/or the haptic feedback device 728.

The detection devices 730(A)-730(N) may be any suitable sensor such as the motion sensors 716, environmental sensors 718, and/or the bio sensors 720 embodied in any suitable device. For example, the detection devices 730 may be incorporated into other user devices, which may be single or multi-purpose. For example, a position sensor may be used to determine whether a door or window has been opened, a motion sensor may be used to determine whether there is movement in a space, light sensors, power sensors, liquid detection sensors, and the like may also be used to perform the customary functions. Any of the sensor data obtained from the external detection devices 730 may be used to implement the techniques described herein.

Turning to FIG. 8, an example process 800 of a one-button pairing method for the home security system 700 is shown. At step 802, the process 800 can involve receiving an input at the hub device 702. The input can direct the hub device 702 to enter a pairing mode. The hub device 702 can be a security system panel or an application executing on a user device. At step 804, the process 800 can involve the hub device 702, in response to receiving the input, entering into a pairing mode to detect that a first detection device 730A has entered an access point mode for extending a range of a wireless network for the first detection device 730A. For example, the hub device 702 can detect the first detection device 730A by receiving a first sub-GHz frequency message from the first detection device 730A. The hub device 702 can determine, based on the first sub-GHz frequency message, that the first detection device 730A has entered the access point mode. Alternatively, the hub device 702 can determine, based on the first sub-GHz frequency message, that the first detection device 730A has not entered the access point mode. In response to determining that the first detection device 730A has not entered the access point mode, the hub device 702 can transmit a second sub-GHz frequency message directing the first detection device 730A to enter the access point mode.

At step 806, the process 800 can involve the hub device 702 receiving, from the first detection device 730A, an identification for the wireless network for the first detection device 730A. In some examples, the hub device 702 may receive the identification in a message from the first detection device 730A that is generated responsive to a different input at the first detection device 730A. At step 808, the process 800 can involve connecting the hub device 702 to the wireless network for the first detection device 730A using the identification. At step 810, the process 800 can involve pairing the first detection device 730A to a wireless router. For example, the hub device 702 can transmit a network identification and an authentication for the wireless router to the first detection device 730A. In some examples, the hub device 702 may transmit the network identification and the authentication via the wireless network for the first detection device 730A.

In some examples, the hub device 702 may determine that the first detection device 730A did not pair to the wireless router. In response to determining that the first detection device 730A did not pair to the wireless router, the hub device 702 can receive input from a user comprising the network identification and the authentication for the wireless router. The hub device 702 can then transmit the input to the first detection device 730A for use in attempting to re-connect to the wireless router. Additionally or alternatively, the hub device 702 may receive a list of wireless routers detected by the first detection device 730A. The hub device 702 may determine a particular wireless router from the list of wireless routers to be paired with the first detection device 730A. The hub device 702 may then pair the first detection device 730A with the particular wireless router. In some examples, the hub device 702 may pair additional detection devices 730 to the wireless router. For example, the hub device 702 may receive, from a second detection device 730B, a third sub-GHz frequency message. The hub device

702 may pair the second detection device 730B to the wireless router using the process 800.

Based on the disclosure and teachings provided herein, a person of ordinary skill in the art will appreciate other ways and/or methods to implement the various embodiments. The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method comprising:

receiving an input at a hub, the input directing the hub to enter a pairing mode, wherein the hub is wirelessly connected to a wireless router; and in response to receiving the input, entering the hub into the pairing mode to:

detect that a first detection device has entered an access point mode for extending a range of a wireless network for the first detection device, wherein the access point mode comprises the first detection device acting as an access point for the wireless network;

receive, from the first detection device, an identification for the wireless network for the first detection device; and in response to detecting that the first detection device has entered the access point mode:

wirelessly connect, using the identification, the hub to the wireless network for the first detection device; and pair, via the wireless connection with the wireless network for the first detection device, the first detection device to the wireless router.

2. The computer-implemented method of claim 1, wherein detecting that the first detection device has entered the access point mode further comprises:

receiving, from the first detection device, a first sub-GHz frequency message; and determining, based on the first sub-GHz frequency message, whether the first detection device has entered the access point mode.

3. The computer-implemented method of claim 2, wherein entering the hub into the pairing mode further comprises:

determining, based on the first sub-GHz frequency message, that the first detection device has not entered the access point mode; and in response to determining that the first detection device has not entered the access point mode, transmitting, to the first detection device, a second sub-GHz frequency message directing the first detection device to enter the access point mode.

4. The computer-implemented method of claim 2, wherein entering the hub into the pairing mode further comprises:

receiving, from a second detection device, a third sub-GHz frequency message; and pairing the second detection device to the wireless router.

5. The computer-implemented method of claim 1, wherein the hub is a security system panel or an application executing on a user device.

6. The computer-implemented method of claim 1, wherein entering the hub into the pairing mode further comprises:

receiving, from the first detection device, a list of a plurality of wireless routers detected by the first detection device;

determining a particular wireless router from the list of the plurality of wireless routers to be paired with the first detection device; and pairing the first detection device with the particular wireless router.

7. The computer-implemented method of claim 1, wherein pairing the first detection device with the wireless router comprises transmitting a network identification and an authentication for the wireless router to the first detection device.

8. The computer-implemented method of claim 7, wherein pairing the first detection device with the wireless router further comprises:

determining that the first detection device did not pair to the wireless router;

receiving input comprising the network identification and the authentication for the wireless router; and transmitting the input to the first detection device.

9. The computer-implemented method of claim 1, wherein receiving the identification for the wireless network for the first detection device comprises receiving the identification in a message from the first detection device that is generated responsive to different input at the first detection device.

10. One or more non-transitory computer-readable media comprising computer-executable instructions that, when executed by one or more computer systems, cause the one or more computer systems to perform operations comprising:

receiving an input at a hub, the input directing the hub to enter a pairing mode, wherein the hub is wirelessly connected to a wireless router; and in response to receiving the input, entering the hub into the pairing mode to:

detect that a first detection device has entered an access point mode for extending a range of a wireless network for the first detection device, wherein the access point mode comprises the first detection device acting as an access point for the wireless network;

receive, from the first detection device, an identification for the wireless network for the first detection device; and in response to detecting that the first detection device has entered the access point mode:

wirelessly connect, using the identification, the hub to the wireless network for the first detection device; and pair, via the wireless connection with the wireless network for the first detection device, the first detection device to the wireless router.

11. The one or more non-transitory computer-readable media of claim 10, further comprising computer-executable instructions that, when executed by one or more computer systems, cause the one or more computer systems to detect that the first detection device has entered the access point mode by:

receiving, from the first detection device, a first sub-GHz frequency message; and determining, based on the first sub-GHz frequency message, whether the first detection device has entered the access point mode.

12. The one or more non-transitory computer-readable media of claim 11, further comprising computer-executable instructions that, when executed by one or more computer systems, cause the one or more computer systems to enter the hub into the pairing mode by:

determining, based on the first sub-GHz frequency message, that the first detection device has not entered the access point mode; and in response to determining that the first detection device has not entered the access point mode, transmitting, to the first detection device, a second sub-GHz frequency message directing the first detection device to enter the access point mode.

13. The one or more non-transitory computer-readable media of claim 11, further comprising computer-executable instructions that, when executed by one or more computer systems, cause the one or more computer systems to enter the hub into the pairing mode by:

receiving, from a second detection device, a third sub-GHz frequency message; and pairing the second detection device to the wireless router.

14. The one or more non-transitory computer-readable media of claim 10, wherein the hub is a security system panel or an application executing on a user device.

15. The one or more non-transitory computer-readable media of claim 10, further comprising computer-executable instructions that, when executed by one or more computer systems, cause the one or more computer systems to enter the hub into the pairing mode by:

receiving, from the first detection device, a list of a plurality of wireless routers detected by the first detection device;

determining a particular wireless router from the list of the plurality of wireless routers to be paired with the first detection device; and pairing the first detection device with the particular wireless router.

16. The one or more non-transitory computer-readable media of claim 10, further comprising computer-executable instructions that, when executed by one or more computer systems, cause the one or more computer systems to pair the first detection device with the wireless router by:

transmitting a network identification and an authentication for the wireless router to the first detection device.

17. The one or more non-transitory computer-readable media of claim 16, further comprising computer-executable instructions that, when executed by one or more computer systems, cause the one or more computer systems to pair the first detection device with the wireless router by:

determining that the first detection device did not pair to the wireless router;

receiving input comprising the network identification and the authentication for the wireless router; and transmitting the input to the first detection device.

18. The one or more non-transitory computer-readable media of claim 10, further comprising computer-executable instructions that, when executed by one or more computer systems, cause the one or more computer systems to receive identification for the wireless network for the first detection device by:

receiving the identification in a message from the first detection device that is generated responsive to different input at the first detection device.

19. A system, comprising:

one or more memories configured to store computer-executable instructions; and one or more processors configured to access the memory and execute the computer-executable instructions to perform operations comprising:

receiving an input at a hub, the input directing the hub to enter a pairing mode, wherein the hub is wirelessly connected to a wireless router; and in response to receiving the input, entering the hub into the pairing mode to:

detect that a first detection device has entered an access point mode for extending a range of a wireless network for the first detection device, wherein the access point mode comprises the first detection device acting as an access point for the wireless network;

receive, from the first detection device, an identification for the wireless network for the first detection device; and in response to detecting that the first detection device has entered the access point mode:

wirelessly connect, using the identification, the hub to the wireless network for the first detection device; and pair, via the wireless connection with the wireless network for the first detection device, the first detection device to the wireless router.

20. The system of claim 19, wherein the one or more memories are further configured to store computer-executable instructions that are executable by the one or more processors to detect that the first detection device has entered the access point mode by:

receiving, from the first detection device, a first sub-GHz frequency message; and determining, based on the first sub-GHz frequency message, whether the first detection device has entered the access point mode.

\* \* \* \* \*